(12) United States Patent
Frazier

(10) Patent No.: US 6,895,499 B1
(45) Date of Patent: May 17, 2005

(54) SYSTEM AND METHOD FOR DEVICE CONFIGURATION AND MANAGEMENT USING A UNIVERSAL SERIAL BUS PORT

(75) Inventor: Alan J. Frazier, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/473,851

(22) Filed: Dec. 27, 1999

(51) Int. Cl.[7] ............................................. G06F 15/177
(52) U.S. Cl. ............................ 713/1; 709/221; 709/224
(58) Field of Search .............................. 713/1; 709/221, 709/224, 228; 710/8

(56) References Cited

U.S. PATENT DOCUMENTS

| | | | |
|---|---|---|---|
| 5,596,723 A | | 1/1997 | Romohr ................. 395/200.16 |
| 5,734,831 A | * | 3/1998 | Sanders ....................... 709/223 |
| 5,774,743 A | | 6/1998 | Story et al. .................. 395/842 |
| 5,774,744 A | | 6/1998 | Story et al. .................. 395/847 |
| 5,890,161 A | | 3/1999 | Helland et al. .............. 707/103 |
| 5,896,544 A | | 4/1999 | Connelly ..................... 395/823 |
| 5,903,896 A | | 5/1999 | Waldman et al. ............ 707/200 |
| 5,918,039 A | | 6/1999 | Buswell et al. .............. 395/527 |
| 6,065,053 A | * | 5/2000 | Nouri et al. ................. 709/224 |
| 6,081,856 A | * | 6/2000 | Comer .......................... 710/67 |
| 6,272,545 B1 | * | 8/2001 | Flanagin et al. ............. 709/228 |
| 6,345,294 B1 | * | 2/2002 | O'Toole et al. .............. 709/222 |
| 6,349,337 B1 | * | 2/2002 | Parsons et al. .............. 709/227 |
| 6,493,770 B1 | * | 12/2002 | Sartore et al. ................... 710/8 |

OTHER PUBLICATIONS

Traveling Software, "LapLink Professional User's Guide", 1998.*
Lawrence J. Magid, "Transferring Computer Files From Afar No Longer Such a Remote Idea", Los Angeles Times, Dec. 16, 1998.*
Belkin Components, "Belkin USB Direct Connect Manual—F5U004 User Manual (Win95/98)", 1998.*
Michelle Campanale, "Connect Your Network With USB", PC World, Jan. 29, 1999.*
Universal Serial Bus Specification Revision 1.1 (Sep. 23, 1998).
"The NC Paradign" (1997).

* cited by examiner

Primary Examiner—Thomas Lee
Assistant Examiner—Albert Wang
(74) Attorney, Agent, or Firm—Baker Botts L.L.P.

(57) ABSTRACT

A method and system for configuring and managing devices including network devices, such as a server computer, is provided in which a computer (24) is coupled to the network device through a USB connection (22). After the computer (24) recognizes the device as a USB-compliant device, the computer establishes data communication with the device. Following the establishment of data communication according to the USB standard, the device can be configured or monitored through the computer.

16 Claims, 2 Drawing Sheets

SYSTEM AND METHOD FOR DEVICE CONFIGURATION AND MANAGEMENT USING A UNIVERSAL SERIAL BUS PORT

TECHNICAL FIELD OF THE INVENTION

The present invention relates in general to the field of device configuration and management, and, more specifically, to a system and method for configuring and managing devices, including network devices, through a Universal Serial Bus port.

BACKGROUND OF THE INVENTION

Personal computer systems were first used as stand-alone computing units. However, the use of personal computers in computer networks has increased dramatically. Computer networks permit multiple users to share the computer hardware and software of the computer network. Computer networks also permit users to share data and information across the network. As such, it is not necessary for the required hardware, software, and data to be installed or stored on the personal computer system of each user of the computer network.

Although the architecture of computer networks varies, a computer network may include at least one dedicated file server, a number of client computers, and a number of shared peripherals. The software of each network device in the computer network, whether a server, printer, or personal computer, must be configured in order to function properly in the network. As an example, although a server will include local software for certain operational purposes, the server must be internally configured and other additional software must be downloaded to the server to permit the server to function for its intended purpose in the computer network. Server configuration in a computer network is often a tedious process that requires the assistance of one or more highly trained network administrators. The difficulty of configuring a server is often enhanced by the absence, in some servers, of a graphical user interface for configuration.

According to one method of configuring the software of a server, a connection between the appliance and a host computer is established. Typically, this is done by connecting a null-modem cable between an RS-232 serial port on the network device and an RS-232 serial port on a host computer. Once a physical or hardware connection is established between the host computer and the network device, a terminal emulator software program is initiated on the host computer. The emulation program permits the host computer to communicate with the network device to be configured. Using a terminal emulation program in this manner as a means for configuring a network device is tedious and complex. Even to enable the most basic networking functions in the network device, the network administrator must often edit lengthy configuration files and issue arcane system commands using a primitive, text-only, command-line interface.

While the foregoing method of network device configuration is common to administrators of Unix systems, administrators of WINDOWS-based networking software are often accustomed to configuration utilities implemented according to the WINDOWS graphical user interface. When confronted with the configuration of a device in an unfamiliar command line environment, an administrator may make mistakes, resulting in improperly or incompletely configured devices and technical service calls to network device manufacturers. Because configuration errors are often routine in such a configuration environment, system administrators must often run error identification and correction routines to locate and correct configuration errors. Errors made during the configuration process may also result in difficult-to-diagnose system problems. The manual entry of command line instructions often requires a complicated series of keystrokes for each command. An error in the command may result in a computing device that operates inefficiently, generates occasional error messages while in operation, or simply fails to function.

In comparison with the difficulties faced by Unix and other command-line interface administrators, relatively inexperienced network administrators may have more familiarity and more success in working with and configuring network devices that operate according to a WINDOWS-based operating system. WINDOWS-based operating systems include a graphical user interface and intuitive configuration modules, or wizards. As compared to the configuration in a command line environment, the configuration of a server in a WINDOWS environment may seem easier and more intuitive, especially for those network administrators who are accustomed to working with a graphical user interface.

SUMMARY OF THE INVENTION

In accordance with the teachings of the present disclosure, a system and method for device configuration and management is disclosed that substantially eliminates or reduces disadvantages associated with prior configuration schemes. The disclosed configuration method involves the use of USB communication between a computer and the device to be configured.

The disclosed configuration method involves coupling the device to be configured and a computer across the USB ports of the device and the computer. Following the establishment of a physical USB connection, the device transmits identification data to the computer, which configures itself to communicate with the device according to the USB standard with the device. Following the initiation of configuration software on the device and the computer, the device can be configured through the USB connection between the computer and the device. The device can be any device that includes an external USB port and the necessary USB hardware and software to permit the device to communicate as if it were a USB-compliant peripheral of a personal computer system. One such device is a server computer. Communicating with a server computer in this manner allows the server computer to be configured as if the server computer were a peripheral of a laptop or other personal computer system. The disclosed method need not be used exclusively for configuration functions. The disclosed communications method can also be used to receive data to monitor the operation of USB-compliant devices.

A technical advantage of the disclosed configuration method is that it permits the configuration of devices with the assistance of the graphical user interface that is present in the configuration computer. In this manner, network administrators accustomed to operating in a WINDOWS-based environment can configure server systems with configuration routines that run on WINDOWS. Because of the familiarity and relative ease of use of current graphical user interfaces, configuration errors are avoided and configuration time is reduced.

Another technical advantage of the disclosed system and method is that it permits a device to function and communicate, at least temporarily, as a peripheral of a computer system. As such, the computer system can communicate with the peripheral according to the existing USB communication standard, allowing the computer system to configure or monitor the device. In this manner, the use of the USB communication standard allows devices that do not normally exist at the peripheral level of a computer system to be easily configured or monitored.

Another technical advantage of the disclosed system and method is that it permits configuration of a headless device, ie., those without traditional user interfaces including devices without a video card, monitor, keyboard, or mouse. In this manner, network administrators can configure server systems that are not otherwise easily accessible.

Another technical advantage of the computer system is that it permits communication between a computer and any USB-compliant device. A computer system may communicate with any device that includes a USB port and the proper USB hardware and software. As such, computer systems may communicate according to the disclosed method with such devices as onboard automotive computers, air conditioning systems, meters, and any number of other data gathering and processing devices. In addition to the foregoing technical advantages, other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

A Universal Serial Bus (USB) is a communication link and communication standard for personal computer systems. The USB standard has been adopted by the current generation of WINDOWS-based operating systems, including WINDOWS 98 and WINDOWS NT. USB-compliant peripherals may be connected to a personal computer system by coupling the peripheral to a USB port of the computer system. With regard to the system level architecture of a personal computer system, the USB port is coupled to the PCI bus of the computer system. The USB standard is advantageous in that it permits the hot swapping of peripherals. As such, USB-compliant peripherals may be connected to and removed from the computer system without rebooting the computer system or configuring the peripheral. USB-compliant peripherals include, for example, scanners, mice, gaming devices, CD-ROM drives, DVD drives, and printers.

Figure 1:
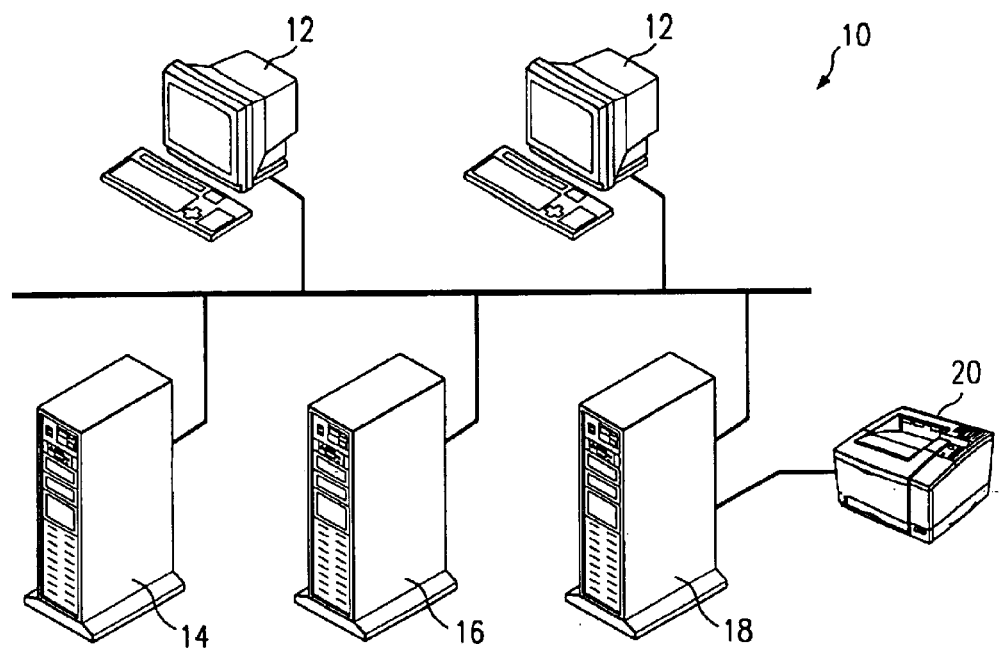
FIG. 1 is a network diagram of a local area network.

Shown in FIG. 1 is a computer network, which is indicated generally at 10. The computer network 10 has the topology of an exemplary local area network (LAN). A LAN is a computer network that is characterized by a client-server network architecture and the ability of the network to provide distributed computing services to users in a defined geographic area or location. A LAN will include network software that resides in or more servers of the network. Other components of the network software are distributed among the client computers of the LAN. The computer network 10 includes a bus 11, a plurality of client computers 12, and a number of network servers. The network servers of computer network 10 include a file server 14, an application server 16, and a printer server 18, which is coupled to a printer 20. Other application-specific servers may be included in the computer network 10, and, in other computer networks, the function of one or more of the servers of FIG. 1 could be combined in a single server unit. In operation, the servers of computer network 10 store files and programs that may be accessed by each of client computers 12 according to established file and application sharing protocols. Computer network 10 may also be coupled to other computer networks, including other LANs, through a communication gateway to form a wide area network (WAN).

Figure 2:
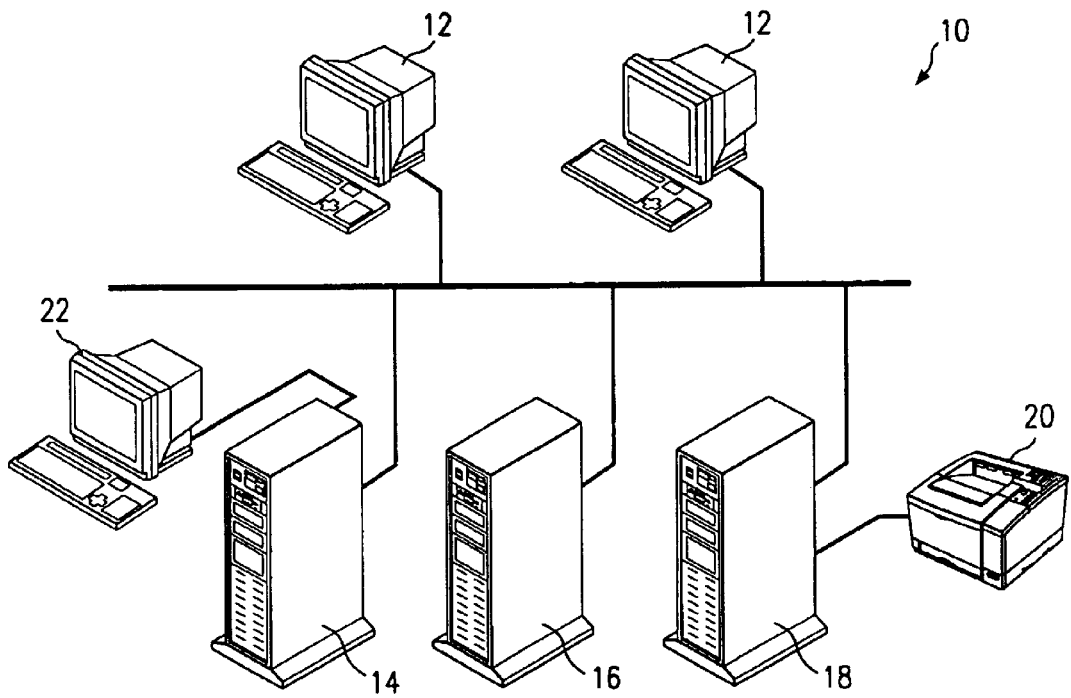
FIG. 2 is a network diagram of a local area network, including the connection of a personal computer to a network device of the local area network.

Shown in FIG. 2 is the computer network of FIG. 1, with the addition of configuration computer 22. Configuration computer 22 is coupled to file server 14 through USB connection 24. Coupling a configuration computer 22 to file server 14 through USB connection 24 allows configuration computer 22 to configure the software of file server 14. Configuration computer 22 must have at least one USB port and the associated USB buses. In order for configuration computer 22 to configure file server 14 through USB connection 24, file server 14 must also include the necessary USB software and hardware. As such, file server 14, which normally functions at the client level of a client-server architecture, must include software and hardware to permit the file server to function at the peripheral level of a personal computer system architecture. In the configuration method disclosed herein, the USB device that is being configured is at the peripheral level of a personal computer system and is able to receive configuration commands from a host personal computer system. As such, file server 14 must include the internal USB hardware and software that is commonly found in modem personal computer systems, including at least one auxiliary external USB port and associated USB buses, to permit file server 14 to function, at least temporarily, as a USB-compliant peripheral coupled to a personal computer system.

With respect to the software requirements of configuration computer 22, configuration computer 22 must include the configuration files necessary to permit configuration computer 22 to recognize file server 14 as a USB device. Once configuration computer 22 recognizes file server 14 as a USB device, configuration computer 22 can perform a USB auto-configure routine to permit data communication between configuration computer 22 and file server 14. Both configuration computer 22 and file server 14 must also include file server configuration software. The file server configuration software, which will vary for each device to be configured, will likely exist as a WINDOWS-based application on the configuration computer. Communication between the file server configuration software of configuration computer 22 and file server 14 will take place across USB connection 24.

Figure 3:
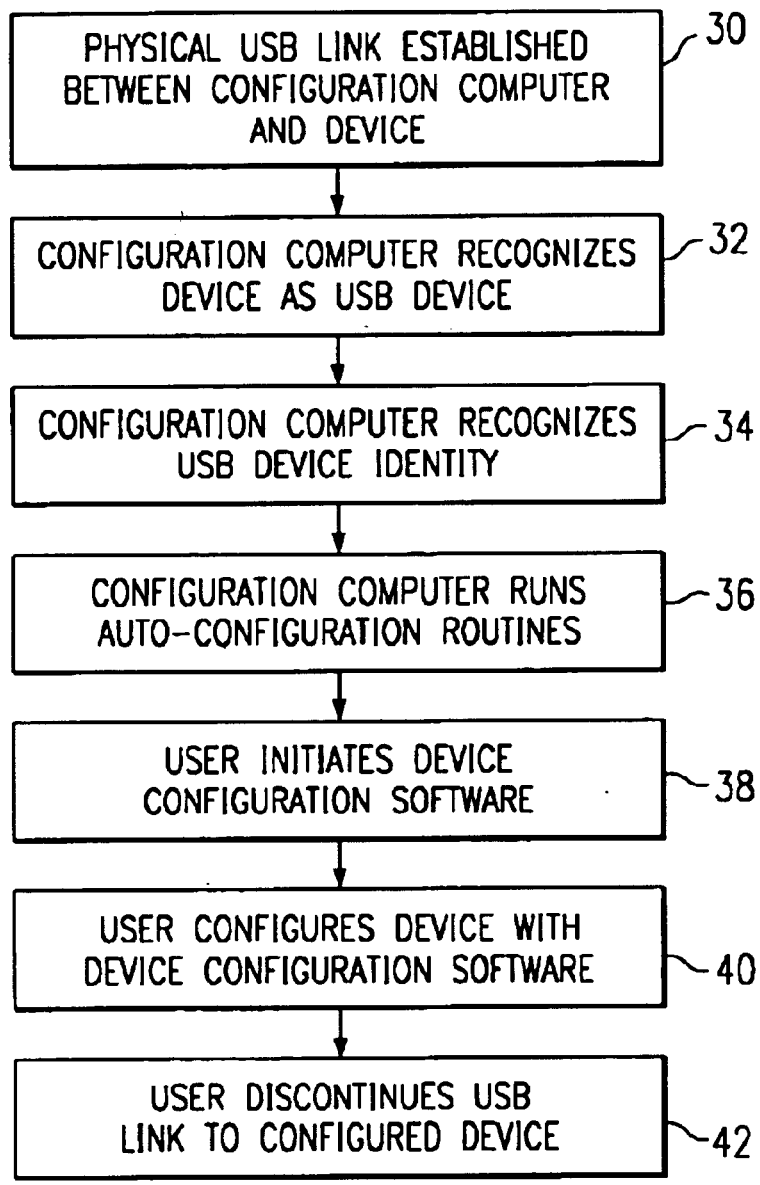
FIG. 3 is a flow diagram of a method for configuring a network device through a USB connection.

Shown in FIG. 3 is a series of connection and configuration steps for the configuration of file server 14 by configuration computer 22. In step 30 of FIG. 3, a physical connection is established between the configuration computer and the device that is to be configured. Here, the device that is to be configured is file server 14, although other servers or other USB-compliant devices may be configured according to the methodology described herein. A network administrator makes the physical connection of step 30 by inserting a USB cable between the auxiliary USB port of file server 14 and the USB port of configuration computer 22. Configuration computer 22 may be a portable computer system, such as laptop or palmtop computer. Depending on the physical configuration of the network site, configuration computer 22 may be a desktop computer. In step 32, configuration computer 22 recognizes file server 14 as a USB-compliant device. In this step, configuration computer 22 recognizes that a device is coupled to its primary USB port and determines whether the device to be configured is USB-compliant.

In step 34, following the recognition by configuration computer 22 that a USB-compliant device is coupled to a USB port of configuration computer 22, configuration computer 22 obtains from the device to be configured the identity of the device. In the present example, configuration computer 22 and file server 14 will perform a series of handshaking protocols in which file server 14 will identify itself to configuration computer 22. In step 36, configuration computer 22 runs an auto-configuration routine. The operating system of configuration computer 22 will include a set of auto-configuration routines for a set of known USB-compliant devices. Once the identity of the configured device is identified in step 34, configuration computer 22 runs the appropriate auto-configuration module in step 36. Following the execution of the auto-configuration routine in step 36, configuration computer 22 is able to transmit data across its USB port to the device to be configured.

In step 38, the network administrator that is responsible for the maintenance of the USB device will initiate the appropriate device configuration software. Once the device configuration software of configuration computer 22 has been initiated, the device configuration software of configuration computer 22 will communicate with the device to be configured to initiate the device configuration software that resides on the USB device to be configured. In this example, the network administrator will initiate file server configuration software on configuration computer 22. Once the file server configuration software on configuration computer 22 has been initiated, configuration computer 22 will, in turn, initiates the file server configuration software that resides on file server 14.

Following the initiation of device configuration software on configuration computer 22 and the device to be configured, the network administrator at step 40 is able to use the file server configuration software to configure the software of the USB-compliant device. It is contemplated that the device configuration software will be a WINDOWS-based application, permitting the user to configure the device through a series of graphics based dialog boxes and configuration routines.

Following the configuration of the USB device, the network administrator at step 40 can terminate the device configuration software, discontinue the USB connection between configuration computer 22 and the USB device, and, if desired, physically disconnect the connection between the now USB device and configuration computer 22. Configuration computer 22 may remain connected to the USB device in order to monitor the operational status of the USB device. If configuration computer 22 is disconnected, the network administrator can then move to the next device to be configured. In the present example, following the configuration of file server 14, the network administrator begins the configuration process for application server 16 or another USB-compliant device in computer network 10.

The present configuration system and method need not be used exclusively with the USB communication standard, but may be used with any communication link and communication standard for personal computer systems that allows for hot-swapping of peripherals, automatic identification of peripherals, and subsequent auto-configuration. Standard-compliant peripherals should be capable of being connected to and removed from the computer system without rebooting the computer system or configuring the peripheral. The communication link and communication standard should allow the configuration computer to configure devices with the assistance of the graphical user interface that resides in the configuration computer.

The configuration system and method disclosed herein may be used for both initial and subsequent configuration of USB-compliant devices. In this manner, a server or other USB-compliant device that is initially installed in the network may be configured according to the disclosed configuration method. In addition, the configuration of a device that has been previously installed in a network may be modified according to the disclosed configuration method. The configuration method may also be used to monitor the status of a USB-compliant network device. In this manner, a host computer may be coupled to the device to read operational data, such as processing speeds, memory capacity, and other parameters, from the network device.

The configuration method described herein may be used with any device that includes the necessary USB hardware and software to permit the device to operate as a USB device for the purposes of configuration and management of the device. The present method may be used to configure a headless device, i.e., a device that has no video card, monitor, keyboard, or mouse. For a device to be configured according to the configuration method disclosed herein, the device must include, at a minimum, an external auxiliary USB port, internal USB buses, and a microcontroller that can run the USB management software to control communications between the USB port and the data sources of the device. As an example, an onboard automotive computer may be configurable as a USB-compliant device according to the disclosed method if a minimal level of hardware and software functionality is included in the onboard automotive computer. The onboard automotive computer would be designed to include a USB port, internal USB buses, and USB communications software. The microcontroller or digital signal processor of the onboard automotive computer would be programmed to handle data communications between the USB port and the data sources of the onboard automotive computer. The onboard automotive computer may include sensors or controls that regulate air intake or fuel mixtures. The settings of these regulators could be changed according to the method disclosed herein. The user would couple a configuration computer to the onboard automotive computer. The configuration computer would recognize the onboard automotive computer as a USB compliant device and configure the configuration computer accordingly. Following the initiation of the device configuration software for the onboard automotive computer, the user can configure the installed software of the onboard automotive computer to manipulate the regulators of the onboard automotive computer.

Other devices that may be configured according to the configuration method disclosed herein include computer-controlled air conditioning systems, water meters, electric meters, gas meters, aircraft flight data recorders, industrial robots, meteorological and seismological data gathering devices, traffic signals, automated teller machines, alarm and security systems, vending machines, and any other programmable device that includes standalone, embedded, computing functionality that is able to execute native applications and that requires periodic or occasional maintenance or configuration. Each device would necessarily include an external auxiliary USB port, internal USB buses, and a microcontroller that can run the USB management software to control communications between the USB port and the data sources of the device.

Although the present invention has been described in detail, it should be understood that various changes, substitutions, and alterations can be made thereto without departing from the spirit and scope of the invention as defined by the appended claims.

What is claimed is:

1. A method for configuring the software of a headless, USB-compliant computer of a computer network, comprising the steps of:

coupling a communications link between the headless computer and a configuration computer, the communications link coupled at a USB port of each of the headless computer and the configuration computer, wherein the headless computer comprises a computer that does not include a monitor, keyboard, mouse, and video card;

establishing data communication between the headless computer and the configuration computer through the communications link coupled between the USB ports of the headless computer and configuration computer; and communicating data between the headless computer and the configuration computer to configure the software of the headless computer.

2. The method for configuring the software of a headless, USB-compliant computer of claim 1, wherein the step of establishing data communication between the headless computer and the configuration computer comprises the steps of, transmitting from the configuration computer to the headless computer a query concerning the identity of the headless computer; and receiving from the headless computer data indicative of the identity of the headless computer.

3. The method for configuring the software of a headless, USB-compliant computer of claim 2, further comprising the step of determining at the configuration computer whether the headless computer is a USB-compliant device.

4. The method for configuring the software of a headless, USB-compliant computer of claim 3, further comprising the step of performing a configuration routine at the configuration computer on the basis of the identity of the headless computer to permit the configuration computer to communicate with the headless computer if the headless computer is determined to be USB-compliant.

5. The method for configuring the software of a headless, USB-compliant computer of claim 4, further comprising the step of initiating configuration application software at the configuration computer.

6. The method for configuring the software of a headless, USB-compliant computer of claim 5, further comprising the steps of communicating between the configuration computer and the headless computer to cause the headless computer to initiate configuration application software at the configuration computer to permit data communication between the configuration computer and the headless computer.

7. The method for configuring the software of a headless, USB-compliant computer of claim 1, wherein the configuration computer is a portable computer.

8. The method for configuring the software of a headless, USB-compliant computer of claim 1, wherein the configuration computer is a palmtop computer.

9. The method for configuring the software of a headless, USB-compliant computer of claim 1, wherein the headless computer is a server computer.

10. A method for configuring the software of a headless, USB-compliant computer, the headless computer having the ability to transmit data according to a data transmission protocol that accommodates hot-swapping of peripherals and automatic identification of peripherals capability, comprising:

coupling a communications link between the headless computer and a configuration computer, the communications link coupled at a USB port of each of the headless computer and the configuration computer, the port having the capability of transmitting data according to the data transmission protocol, wherein the headless computer comprises a computer that does not include a monitor, keyboard, mouse, and video card;

establishing data communication between the headless computer and the configuration computer through communications link and the ports of the headless computer and the configuration computer; and communicating data between the headless computer and the configuration computer to configure the software of the headless computer.

11. The method for configuring the software of the headless, USB-compliant computer of claim 10, wherein the step of establishing data communication between the headless computer and the configuration computer comprises the steps of:

transmitting data from the configuration computer to the headless computer a query concerning the identity of the headless computer; and receiving from the headless computer data indicative of the identity of the headless computer.

12. The method for configuring the software of the headless, USB-compliant computer of claim 11, further comprising the step of determining at the configuration computer whether the headless computer has the ability to transmit data according to the data transmission protocol.

13. The method for configuring the software of the headless, USB-compliant computer of claim 11, further comprising the step of performing a configuration routine at the configuration computer on the basis of the identity of the headless computer to permit the configuration computer to communicate with the headless computer if the headless computer is determined to have the ability to transmit data according to the data transmission protocol.

14. The method for configuring the software of the headless, USB-compliant computer of claim 13, further comprising the step of initiating configuration application software at the configuration computer.

15. The method for configuring the software of the headless, USB-compliant computer of claim 14, further comprising the steps of communicating between the configuration computer and the headless computer to cause the headless computer to initiate configuration application software at the configuration computer to permit data communication between the configuration computer and the headless computer using a graphical user interface.

16. The method for configuring the software of the headless, USB-compliant computer of claim 10, wherein the headless computer is a server computer.

* * * * *